US008799291B2

(12) United States Patent
Lee et al.

(10) Patent No.: US 8,799,291 B2
(45) Date of Patent: Aug. 5, 2014

(54) FORENSIC INDEX METHOD AND APPARATUS BY DISTRIBUTED PROCESSING

(75) Inventors: Joo Young Lee, Daejeon (KR); Youn Hee Gil, Daejeon (KR); Do Won Hong, Daejeon (KR); Keon Woo Kim, Daejeon (KR); Young Soo Kim, Daejeon (KR); Sung Kyong Un, Daejeon (KR); Sang Su Lee, Daejeon (KR); Su Hyung Jo, Daejeon (KR); Woo Yong Choi, Daejeon (KR); Hyun Sook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 17 days.

(21) Appl. No.: 13/601,925

(22) Filed: Aug. 31, 2012

(65) Prior Publication Data
US 2013/0117273 A1 May 9, 2013

(30) Foreign Application Priority Data
Nov. 3, 2011 (KR) .......................... 10-2011-0114168

(51) Int. Cl.
 *G06F 17/30* (2006.01)
(52) U.S. Cl.
 USPC ................... 707/741; 707/803; 707/E17.083
(58) Field of Classification Search
 CPC ............ G06F 17/30312; G06F 17/30946; G06F 17/30613; G06F 17/30067; G06F 17/30619; G06F 17/30321
 USPC .................. 707/741, E17.059, E17.083, 803, 707/999.102
 See application file for complete search history.

(56) References Cited

U.S. PATENT DOCUMENTS

| 5,551,027 | A | * | 8/1996 | Choy et al. ............................. 1/1 |
| 5,960,194 | A | * | 9/1999 | Choy et al. ............................. 1/1 |
| 6,304,874 | B1 | * | 10/2001 | Corley et al. ......................... 1/1 |
| 6,778,977 | B1 | * | 8/2004 | Avadhanam et al. ......... 707/737 |
| 7,590,645 | B2 | * | 9/2009 | Nayak ..................................... 1/1 |
| 7,693,813 | B1 | * | 4/2010 | Cao et al. ............... 707/999.001 |
| 7,702,614 | B1 | * | 4/2010 | Shah et al. ..................... 707/741 |
| 7,836,037 | B2 | * | 11/2010 | Renkes et al. ................ 707/705 |
| 7,895,185 | B2 | * | 2/2011 | Chen et al. .................... 707/711 |
| 7,904,545 | B2 | * | 3/2011 | Golovchinsky et al. ...... 709/224 |
| 7,925,655 | B1 | * | 4/2011 | Power et al. .................. 707/741 |

(Continued)

FOREIGN PATENT DOCUMENTS

| KR | 10-2002-0067162 A | 8/2002 |
| KR | 10-2011-0066344 A | 6/2011 |

OTHER PUBLICATIONS

Mishra S., "Keyword Indexing and Searching for Large Forensics Targets using Distributed Computing", Dissertations and Theses, University of New Orleans, May 18, 2007, 107 pages.*

(Continued)

*Primary Examiner* — Phuong Thao Cao

(57) ABSTRACT

Provided is a forensic index method by distributed processing, including: generating data to be divided by dividing data to be indexed according to predetermined division setting for distributed processing; allocating the generated data to be divided to a plurality of data processing units according to the predetermined division setting, extracting an index by filtering the allocated data to be divided in the plurality of data processing units, and generating divided index data including the extracted index; and generating an index database by merging the generated divided index data.

15 Claims, 9 Drawing Sheets

(56) References Cited

U.S. PATENT DOCUMENTS

| | | | |
|---|---|---|---|
| 7,970,132 B2* | 6/2011 | Fahrny et al. | 380/42 |
| 7,979,437 B2* | 7/2011 | Shin | 707/741 |
| 8,090,710 B2* | 1/2012 | Barsness et al. | 707/713 |
| 8,095,500 B2* | 1/2012 | Rose et al. | 707/609 |
| 8,195,929 B2* | 6/2012 | Banga et al. | 713/2 |
| 8,229,916 B2* | 7/2012 | Narang et al. | 707/711 |
| 8,312,023 B2* | 11/2012 | Shields et al. | 707/742 |
| 8,346,731 B1* | 1/2013 | Tsaur et al. | 707/673 |
| 8,442,982 B2* | 5/2013 | Jacobson et al. | 707/741 |
| 8,527,497 B2* | 9/2013 | Singh et al. | 707/711 |
| 2003/0229626 A1* | 12/2003 | Nayak | 707/3 |
| 2004/0199507 A1* | 10/2004 | Tawa, Jr. | 707/7 |
| 2004/0199530 A1* | 10/2004 | Avadhanam et al. | 707/100 |
| 2004/0210946 A1* | 10/2004 | Shin | 725/135 |
| 2004/0225865 A1* | 11/2004 | Cox et al. | 712/34 |
| 2006/0010146 A1* | 1/2006 | Nayak | 707/100 |
| 2006/0020616 A1* | 1/2006 | Hardy et al. | 707/101 |
| 2006/0031873 A1* | 2/2006 | Fahrny et al. | 725/31 |
| 2006/0215298 A1* | 9/2006 | Itoi et al. | 360/60 |
| 2007/0005661 A1* | 1/2007 | Yang | 707/200 |
| 2007/0011212 A1* | 1/2007 | Koppich et al. | 707/203 |
| 2007/0100851 A1* | 5/2007 | Golovchinsky et al. | 707/100 |
| 2007/0100873 A1* | 5/2007 | Yako et al. | 707/102 |
| 2007/0198506 A1* | 8/2007 | Attaran Rezaei et al. | 707/5 |
| 2008/0046473 A1* | 2/2008 | Miao et al. | 707/200 |
| 2008/0082489 A1* | 4/2008 | Chen et al. | 707/3 |
| 2008/0133464 A1* | 6/2008 | Shin | 707/2 |
| 2008/0319987 A1* | 12/2008 | Takuma et al. | 707/5 |
| 2009/0157601 A1* | 6/2009 | Lee et al. | 707/2 |
| 2009/0216641 A1* | 8/2009 | Hubbard | 705/14 |
| 2009/0265306 A1* | 10/2009 | Barsness et al. | 707/2 |
| 2010/0036723 A1* | 2/2010 | Hubbard | 705/14.14 |
| 2010/0161615 A1* | 6/2010 | Lee et al. | 707/741 |
| 2011/0228942 A1* | 9/2011 | Fahrny et al. | 380/278 |
| 2012/0143873 A1* | 6/2012 | Saadat | 707/741 |
| 2012/0179684 A1* | 7/2012 | Alba et al. | 707/738 |
| 2012/0254089 A1* | 10/2012 | Alba et al. | 706/47 |
| 2012/0323919 A1* | 12/2012 | Alba et al. | 707/738 |
| 2012/0323920 A1* | 12/2012 | Alba et al. | 707/739 |
| 2013/0238584 A1* | 9/2013 | Hendry | 707/706 |
| 2013/0246336 A1* | 9/2013 | Ahuja et al. | 707/600 |
| 2013/0246431 A1* | 9/2013 | Ahuja et al. | 707/740 |
| 2013/0254208 A1* | 9/2013 | Hazel et al. | 707/741 |
| 2014/0032511 A1* | 1/2014 | Takahashi et al. | 707/696 |

OTHER PUBLICATIONS

Narang et al., "Highly Scalable Algorithm for Distributed Real-Time Text Indexing", IBM India Research Laboratory, India, 2009, 10 pages.*

Cambridge University Press, "Distributed Indexing", copyright 2008, dated Apr. 7, 2009, 4 pages, accessed online at <http://nlp.stanford.edu/IR-book/html/htmledition/distributed-indexing-1.html> on Dec. 24, 2013.*

Annexstein et al., "Indexing Techniques for File Sharing in Scalable Peer-to-Peer Networks", In Proceedings of the 11th International Conference on Computer Communications and Networks, IEEE, 2002, 6 pages.*

Winter et al., "A Distributed Indexing Strategy for Efficient XML Retrieval", In Efficiency Issues in Information Retrieval Workshop (EIIR 2008) at ECIR 2008, Glasgow, Scotland, 2008, 10 pages.*

Lee et al., "Improving Performance in Digital Forensics", In 2009 International Conference on Availability, Reliability and Security, IEEE Computer Society, 2009, pp. 1001-1005.*

* cited by examiner

<Prior Art>

<Prior Art>

FIG. 4A

| Term (Primary Row Key) | FIDs |
|---|---|
| word 1 | 1, 2, 4, 8 |
| word 2 | 2, 3, 5 |
| word 3 | 6, 9 |

FIG. 4B

| Pattern (Primary Row Key) | FID | Frequency | Start/End Address |
|---|---|---|---|
| Pattern 1 | 1 | 2 | 0x0001~0x0003, 0x0010~ |
|  | 2 | 1 | 0x0012~0x0013 |
|  | 3 | 2 | 0x00C2~0x00D1 |
| Pattern 2 | 3 | 1 | ... |
|  | 4 | 5 | ... |

FIG. 5A

| IndexDBName | List |
|---|---|
| A. idx | A. idx |
| B. idx | B. idx |
| C. idx | C. idx  X. idx |
| D. idx | C. idx  D. idx |
| E. idx | E. idx  E'. idx |
| E'. idx | E'. idx |

FIG. 5B

| FileID (FID) |
|---|
| 3 |
| 9 |
| .. |

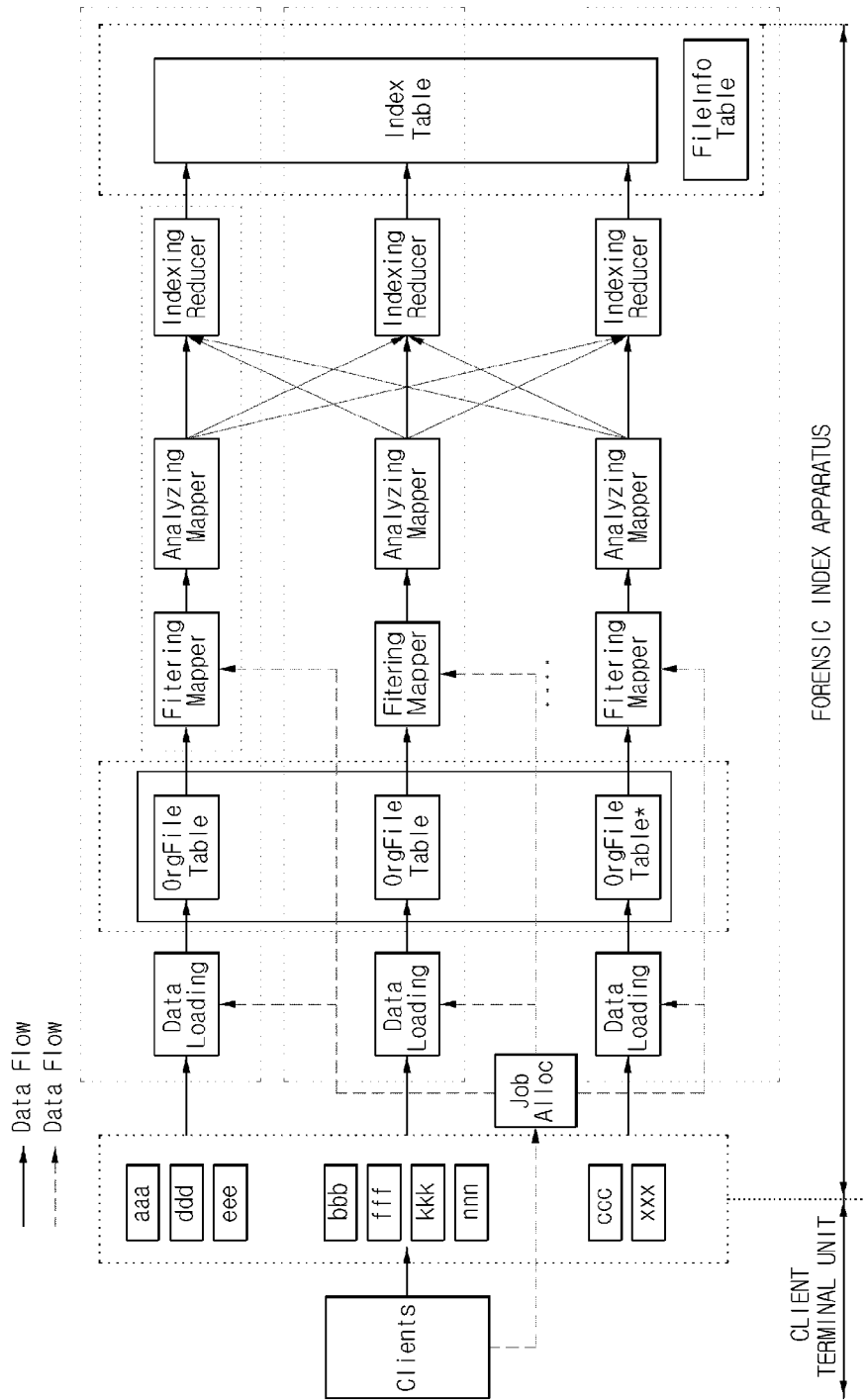

US 8,799,291 B2

FORENSIC INDEX METHOD AND APPARATUS BY DISTRIBUTED PROCESSING

CROSS-REFERENCE TO RELATED APPLICATIONS

This application claims priority to and the benefit of Korean Patent Application No. 10-2011-0114168 filed in the Korean Intellectual Property Office on Nov. 3, 2011, the entire contents of which are incorporated herein by reference.

TECHNICAL FIELD

The present invention relates to a method and an apparatus of a forensic index by distributed processing, and more particularly, to a method and an apparatus of a forensic index by distributed processing that divide target data to be indexed and index the divided data through distributed processing.

BACKGROUND ART

With a rapid growth in the amount of digital data generated and stored in a daily life as well as in various environments, a lot of time is required to perform each step of digital forensics.

In a 'forensic retrieval' process in the digital forensics, since retrieval depending on repeated queries should be performed in order to rapidly find a piece of evidence in a large quantity of data, a significant amount of time is required.

However, text retrieval tools used in the digital forensics at present perform retrieval at an average speed of approximately 20 MB/s with respect to one query. When the text retrieval tools are used, 14 hours or more are required to retrieve a query in data of 1 TB and as a time required to one retrieval operation, a time which is in proportion to the number of times is required at the time of requesting a plurality of retrievals.

When various documents published in a digital forensic field or application examples are synthesized, contents associated with the "size" of a hard disk drive to be investigated are mentioned most frequently and considered most urgently in digital forensic analysis.

For example, when an eDiscovery field that has recently become a hot issue of the digital forensic field is considered, a company should store and keep electronic documents (ESDs) generated therein for approximately 3 to 6 months and should find materials required when a relevant case is presented and submit found materials to a court of law within the period.

However, the size of an e-mail generated or received daily within a domestic major company group is at least 500 GB or more and the size of the e-mail is apparently considerable even though the size of the e-mail kept for 3 months is simply calculated.

Considering that it takes a short time to prosecute after seizing evidence in a domestic legal environment, an efficient retrieval method has been increasingly required in investigating a large scale of storage media including a PC, an electronic settlement system, an electronic mail system, and an accounting database.

One of solutions capable of solving known problems is an index based retrieval technique. The index retrieval technique is a technique that generates an index of target data and presents a retrieval result in real time by referring to the index during retrieval. The index retrieval technique has a characteristic in that some time is required to generate the index, whereas all retrievals are performed in real time after the index is generated.

However, enormous index analysis and retrieval algorithms for data stored in a predetermined medium have been continuously proposed and a research in the digital forensic field is increasingly required again even though the algorithms are applied to various fields at present because the index retrieval techniques are not suitable for digital forensic evidence retrieval.

Most index retrieval techniques which are used to retrieve web data on the Internet aim at rapidly providing as many retrieval results as possible by finding most similar information as a user's intention among data including a user's queries.

However, the digital forensic retrieval aims at accurately providing whether a query made by an investigator is included within a predetermined large quantity of evidence data and which position the query is included in without fail.

In regards to this aspect, the digital forensic retrieval is different from existing index retrieval techniques in terms of a content and an amount of information to be stored in the index database, and a processing procedure. The existing index retrieval techniques focus on an index retrieval speed, whereas the digital forensic retrieval focuses on an index generation speed.

Even though index retrieval functions provided in the existing digital forensic tool are provided integrally with or independently from the digital forensic tools, the index retrieval functions are provided to be operated in a single system.

The providing pattern reaches the limit quickly again even though a specification of system hardware at the time of indexing a large quantity of data is improved, such that performance rapidly deteriorates.

Accordingly, requirements for improving the index generation speed have been gradually increased so that a large quantity of evidences are substantially retrieved in the digital forensics.

SUMMARY OF THE INVENTION

The present invention has been made in an effort to provide a method and an apparatus of generating a distributed forensic index in order to improve a data retrieval time required during digital forensic retrieval with respect to a large quantity of digital data.

An exemplary embodiment of the present invention provides a forensic index method by distributed processing, including: generating data to be divided by dividing data to be indexed according to predetermined division setting for distributed processing; allocating the generated data to be divided to a plurality of data processing units according to the predetermined division setting, extracting an index by filtering the allocated data to be divided in the plurality of data processing units, and generating divided index data including the extracted index; and generating an index database by merging the generated divided index data.

Another exemplary embodiment of the present invention provides a forensic index apparatus by distributed processing, including: a division target data managing unit generating data to be divided by dividing data to be indexed according to predetermined division setting for distributed processing; a divided index data generating unit allocating the generated data to be divided to a plurality of data processing units according to the predetermined division setting, extracting an index by filtering the allocated data to be divided in the plurality of data processing units, and generating divided index data including the extracted index; and an index database managing unit generating an index database by merging the generated divided index data.

Yet another exemplary embodiment of the present invention provides a forensic index system by distributed processing, including: a terminal unit providing an input interface to a user; a data storage unit storing data to be indexed; and a forensic index apparatus dividing the data to be indexed according to predetermined division setting, generating divided index data by using a plurality of data processing units with respect to the divided data to be divided, and generating an index database by merging the generated divided index data.

According to exemplary embodiments of the present invention, data retrieval required for digital forensic analysis is performed within a shorter time than an existing single system. Since scalability is provided, used resources can be increased or decreased according to the amount of data to be analyzed, thereby controlling performance.

Scalability of an indexing system can be improved, and thus a processing velocity which is the largest issue among requirements in forensic analysis is significantly improved.

A retrieval system used for a single user on a single platform provides a digital forensic function to a user in a service type on a distributed/parallel platform, such that individual users do not need to exert efforts to operate and manage a forensic tool and a plurality of users simultaneously access the retrieval system to use a service, and as a result, utilization of the system and data is improved.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 4A and 4B are reference diagrams illustrating a storage structure of an index database in the forensic index method by distributed processing according the exemplary embodiment of the present invention.

FIGS. 5A and 5B are reference diagrams illustrating a data structure during updating in the forensic index method by distributed processing according the exemplary embodiment of the present invention.

FIG. 9 is a block diagram illustrating a forensic index system by distributed processing using a Hadoop system according to yet another exemplary embodiment of the present invention.

Figure 1:
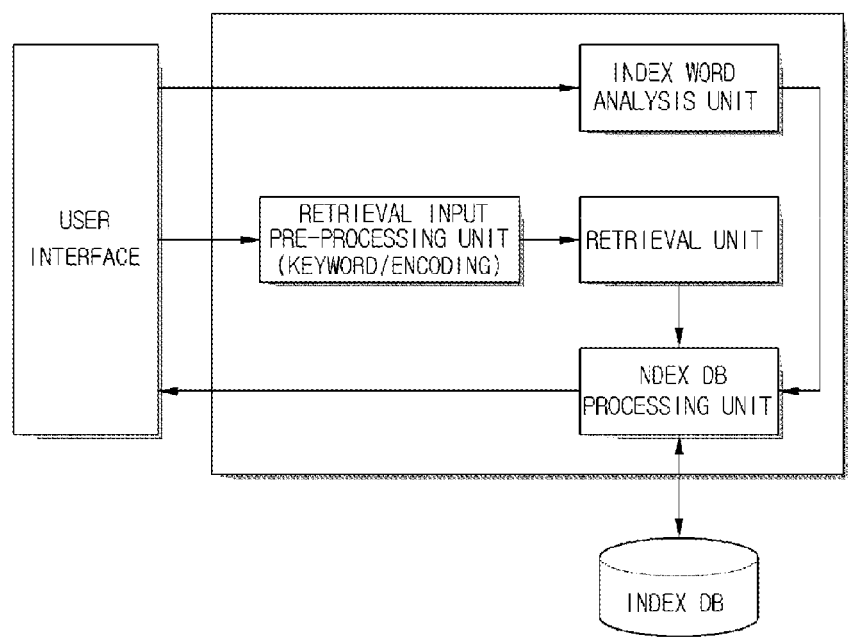
FIG. 1 is a reference diagram illustrating an example of a general index apparatus in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. In describing a preferred embodiment of the present invention, well-known functions or constructions will not be described in detail since they may unnecessarily obscure the understanding of the present invention.

FIG. 1 is a reference diagram illustrating an example of a general index apparatus in the related art. An index word analyzing unit performs analysis of a word to be indexed on data and morpheme based indexing method, a word based indexing method, an N-gram based indexing method, and the like are generally used. The word to be indexed generates an index database through analysis and by processing the index database.

When the index database is generated, a user may perform a query for retrieval through a user interface and the query is generally subjected to preprocessing such as stopword processing, N-gram processing, an encoding change, or the like according to an indexing algorithm through analysis of the word to be indexed by using a retrieval input preprocessing unit.

As a retrieval word subjected to the preprocessing, the index registered in the index database is retrieved by the retrieval unit and the retrieval result is provided to the user through the index database processing unit.

Figure 2:
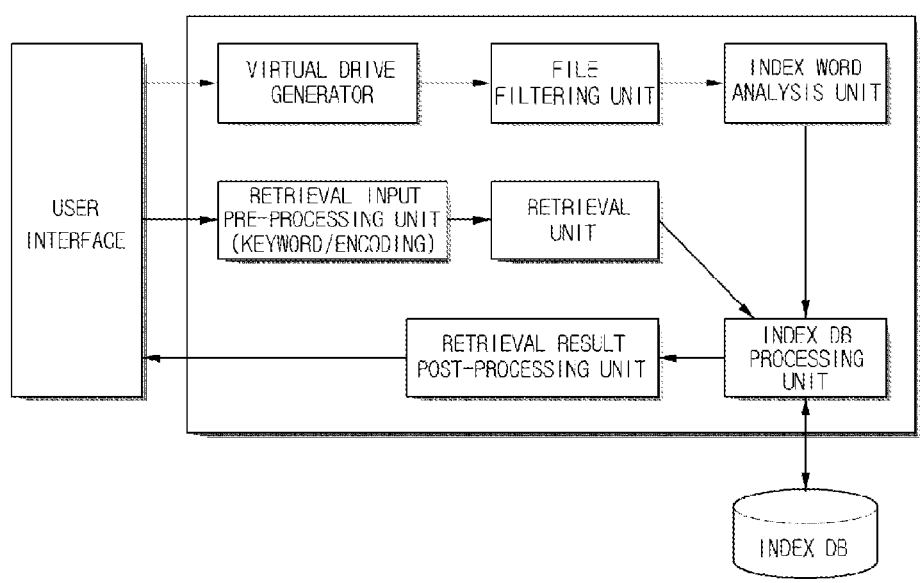
FIG. 2 is a block diagram of a forensic index apparatus operated in a known single system.

FIG. 2 is a block diagram of a forensic index apparatus operated in a single system in the related art. A single system based forensic index apparatus has a similar structure as the general index apparatus, but a forensic image may be loaded by using a virtual drive generator and a file filtering unit between the user interface and the index word analyzing unit and data indexing for a forensic investigation may be performed. However, a significant time is required to generate an index for a large quantity of data and an index retrieval function may not actually be utilized in the forensic investigation.

Figure 3:
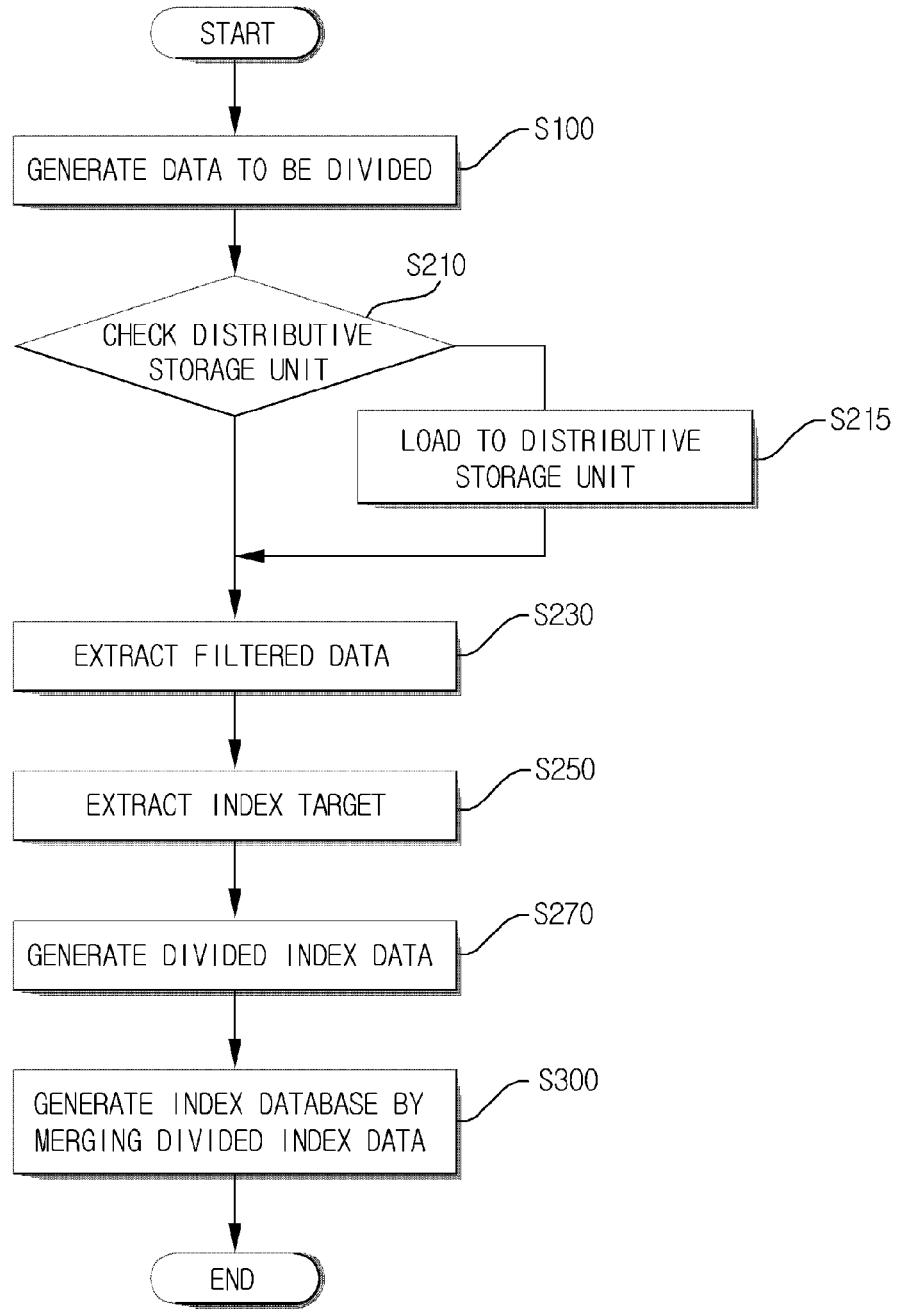
FIG. 3 is a flowchart illustrating a forensic index method by distributed processing according to an exemplary embodiment of the present invention.

Referring to FIG. 3, a method for a forensic index by distributed processing according to an exemplary embodiment of the present invention will be described.

The index apparatus having a plurality of data processing units divides the data to be indexed according to predetermined division setting for distributed processing to generate data to be divided (S100).

The data to be indexed as data received from the user and to be indexed may be received from a data storage unit constituted by a central storage device or an external data storage device.

The predetermined division setting as information set to the data to be indexed for distributed processing may include division setting depending on the number of data processing units for distributed processing the data to be indexed, and the sizes and the number of files of the data to be indexed. According to the exemplary embodiment of the present invention, the number of files included in the data to be indexed may be implemented to be divided equally depending on the number of the data processing units included in the forensic index apparatus and as another implementation example, the sizes of the files included in the data to be indexed are calculated to divide the data to be indexed by considering the sizes of the files so that indexing ends within a predetermined time range when the data to be indexed are distributively processed by using the respective data processing units. The predetermined time range as a time range for efficiently executing the indexing database may be previously set by the user.

When the data to be divided is generated by dividing the data to be indexed, the individual data processing units load the data to be divided, which are allocated, respectively (S230). According to one implementation example, the data to be divided may include a data list and resulting data.

When the data to be divided have already been loaded to the individual data processing units, processes of loading the data to the individual data processing units may be skipped (S215).

When the data to be divided, which are allocated to the individual data processing units, is loaded, the respective data processing units are controlled to generate the index. The individual data processing units may include distribution storage units according to the exemplary embodiment of the present invention and the forensic index apparatus may be implemented in such a manner that one virtual distribution storage unit is used as a data storage unit by collecting the distribution storage units of the individual data processing units. In this case, a distributed file system (DFS) may be used to access the data storage unit and the individual data processing units may include DFS input/output controlling units.

The DFS input/output controlling units assure that the data storage unit accesses the data in the distribution storage unit of the forensic index apparatus where an indexing procedure is performed in the data storage unit, thereby improving working performance. That is, when the data is loaded to the distribution storage unit included in the individual data processing units in order to distributively process the generation of the index, the data processing units process the loaded data to assure locality.

Therefore, a distributed processing frame work such as Apache Hadoop may be used for assuring the locality and stable distributed processing. Hadoop as a distributed processing frame work developed to distributively process a large quantity of data provides HDFS and MapReduce as a distributed processing programming model to the distributed file system.

Individual division index data generating units 200 filter the data to be divided, which are allocated to the respective data processing units. According to the exemplary embodiment of the present invention, metadata is included in the data to be divided (S230) or the data to be divided is converted into text data by using a file filter including a virtual file system (VFS) in order to process a forensic image file (DD and Encase) (S215). According to the exemplary embodiment of the present invention, when the data to be divided is a forensic image such as a DD or Encase image, data included in the corresponding image is extracted by using the file filter including the virtual file system (VFS) for the image. Extracting the data included in the image means collecting information scattered on the image and extracting or restoring the collected information in one file type by configuring a file system table such as an NTFS or an FAT to provide the extracted or restored information to the user. A file deleted or lost through the extraction process may be restored and the extracted file may be converted into text data similarly as other general files.

When converting the metadata and a forensic image type data file into a text type is terminated, filtered data are extracted by reading the allocated data (S230). The allocated data may include various formats of documents such as a compression file, an image file, a moving picture file, a music file, and the like as well as a general document and when the forensic image is attached, the allocated data may include the data converted into the text data according to the virtual file system (VFS). The filtered data may include data converted into a plain text without a format.

A filtering unit may extract the deleted file as well as a file included in the data to be indexed, which is normally present. In some cases, the filtering unit may include a function to extract data intentionally hidden on the system or data of which some are lost due to loss, damage, or the like. That is, the information scattered on the image is collected and extracted in one file type to be provided to the user by configuring the file system table such as the NTFS, the FAT, or the like, thereby restoring even the deleted or lost file.

The index is extracted by analyzing data acquired by filtering the data to be divided (S270). Various methods such as an N-gram method, a morpheme analysis method, a pattern matching method, and the like may be used as a method of analyzing data of which the index is extracted. According to the exemplary embodiment of the present invention, the index may be implemented to be extracted by using bigram analysis and pattern analysis.

An index target is extracted by dividing the filtered data to be divided into N-gram, that is, N syllabic units to configure the index database and the index is extracted by comparing the extracted index target with a predetermined pattern to configure the index database.

Referring to FIG. 4A, a method of extracting the index target through the bigram analysis will be described. An index term is used as a primary row key in the case of extracting the index target through the index analysis and stored data corresponding to individual keys may use a file identifier list. A bigram analysis unit may extract the index target by analyzing a text with two syllables. Therefore, a recall ratio may be improved by using the bigram and the recall ratio represents a ratio between information retrieved according to a predetermined condition and all information to be retrieved.

Referring to FIG. 4B, extracting the index target through the pattern analysis will be described. The pattern is used as the primary row key in the case of extracting the index through the index analysis and the stored data corresponding to the individual keys may use the file identifier list. The file identifier list allocates identifiers FID with respect to individual patterns and may be configured to include a frequency and a start/end address on a memory with respect to individual identifiers.

In the pattern analysis, an index and a position corresponding to the index which are matched to each other in individual documents are analyzed by using a result of analyzing data having a predetermined pattern such as a registration number and a telephone number. The pattern analysis may be set for the user to use predetermined term data and the like for forensic analysis. The predetermined term data may target data including an e-mail, the telephone number, and the registration number, but are not limited thereto.

The predetermined term data and the filtered data are matched by using the pattern analysis to extract the index and a use frequency of the index and the pattern analysis is excellent in performance at the time of analyzing a large quantity of forensic data.

In generating the divided index data (S270), the index extracted and the data from which the index is extracted are matched with each other by using the bigram analysis and the pattern analysis and the matched data are generated as the divided index data through shuffling, sorting, and merging. According to the exemplary embodiment of the present invention, the divided index data including information indicating which the index is extracted from are generated by matching indexes extracted from a plurality of files and data from which the respective indexes are extracted.

The forensic index apparatus generates the index database by receiving the divided index data from the respective data processing units and merging the received divided index data (S300). By considering a management cost, it is more advantageous in terms of the management cost to store individual files having a large size than the individual files having a small size.

Therefore, an original file having a small size is configured as one database in order to improve a processing speed and prevent a storage space from being wasted at the time of distributively processing a large quantity of data and the original file is configured by the table, such that a material structure to be stored is simplified.

According to the exemplary embodiment of the present invention, the method may further include updating the index. In a known index updating method, in the case where the index database is configured in a tree structure, it is not easy to add or delete new index data to or from the corresponding index database when a file to be indexed is added or deleted.

When the index data are added, the tree structure of the index database needs to be reconfigured according to an added word and when the word is deleted, it is required to remove an identifier of a corresponding document to be deleted while traversing all index data. Therefore, adding or deleting the index in the related art requires a process and a time similar as regenerating the index.

Therefore, the method may further include updating the index by integrating the index and the index database by using index data having temporary indexes in order to solve a problem of adding or deleting the index in the related art.

Figure 5B:
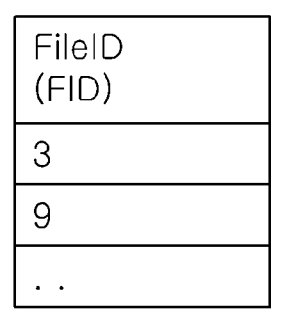

Referring to FIGS. 5A and 5B, a material structure and a deleted file list of the index database will be described. The index database uses an index database identifier (IndexDB-Name) as a key and may include an identifier list having an index as data stored to correspond to the key. Information on the deleted file may be implemented to store an identifier of the deleted file (FID) by configuring an additional database.

The index database identifier as the key is real index data viewed to the general user and the real index database is configured by an identifier list including one or more index data.

When a new index is generated in the index database, a name of the index is set as the key of the index database at the time when the generation of the index is completed and a value corresponding to the index is registered.

When a file is added to the existing index database, a temporary index data having a temporary index is newly generated by only the additional file and the index generated in the index database is registered. A key and a value of the temporary index data are registered in the index database.

All index databases having the value of the index database are retrieved during retrieval and retrieval results are integrated and provided to the user.

According to the exemplary embodiment of the present invention, the method may further include performing retrieval by using the index database by receiving the retrieval word. A storage structure of the index database is simplified through the bigram analysis and a pattern expressed regularly is found by retrieving the pattern to store information on the corresponding pattern in the index database of a table type, and as a result, the result may be provided to the user by performing the forensic retrieval with respect to the index database.

According to the exemplary embodiment of the present invention, the retrieval word is pre-processed and by retrieving the index database, post-processing may be performed in order to improve accuracy of the retrieval result.

The pre-processing of the retrieval word means removing a stopword which is meaningless as the retrieval word or changing encoding. The stopword as a stop which is not used a retrieval word in retrieval means, for example, a word which is meaningless as a retrieval index such as an article, a preposition, a postposition, and a conjunction.

The post-processing of the retrieval result means, for example, outputting the retrieval result by filtering a digital material retrieved by targeting a bigram index. For example, the outputted retrieval result may include each document name including the retrieval word and a frequency within the document.

A method of performing index retrieval while maintaining an index updating state according to the exemplary embodiment of the present invention will be described.

The forensic index apparatus performs filtering of a retrieval keyword from the user in order to retrieve index data. According to the exemplary embodiment of the present invention, a bigram in the N-gram may be analyzed. The index data is retrieved in the index database and a value of an intersection of the retrieved results (FID) is set as a primary result for a corresponding character string. When a plurality of character strings are present, the process is repeated and operations such as AND, OR, and NOT inputted for the corresponding results are applied when the process is completed.

As a next step, the character string is retrieved by acquiring a file content with respect to a primary result and a file including the character string is set as a secondary result. When the bigram analysis and the character string retrieval are both performed, the recall ratio is improved by the bigram analysis and the accuracy of the retrieval result is improved by removing unnecessary information (garbage) included in the retrieval result.

It is judged whether a file identifier included in the secondary result is included in the deleted file list and when the file identifier is not included, the corresponding result is included in a final retrieval result.

When the index data to be retrieved is configured by one or more index data by referring to the index database diagramed in FIG. 5A, the retrieval is performed through the same process with respect to the corresponding DB and the corresponding result is included in a final result.

The final result may include the file identifier, and a file position and a file path of a URI or URL type of the file including the character string. In particular, when a client uses a device having a deteriorated computing power, such as a mobile device, the retrieval result is provided by using URL, and as a result, a server takes charge of most processing such as document filtering, such that the user may acquire a desired result at any time and anywhere while a load of the client is reduced.

Figure 6:
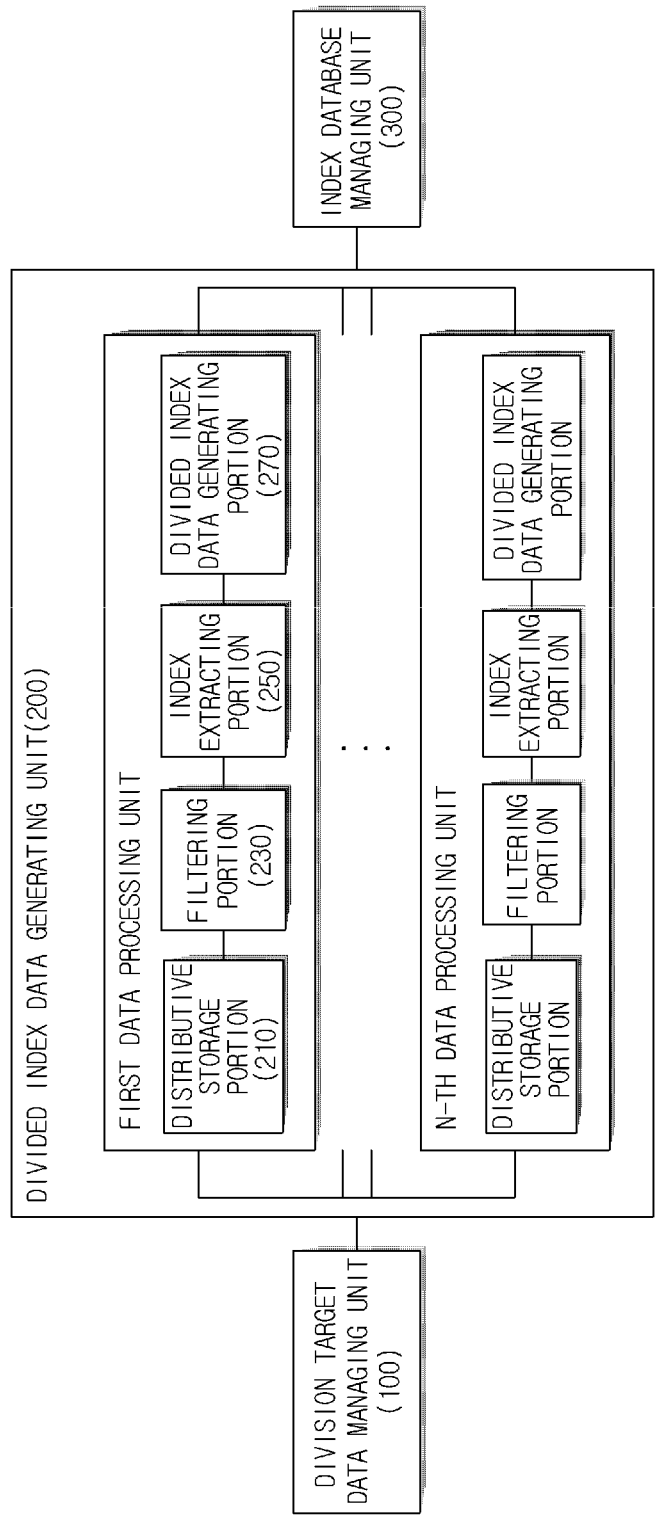
FIG. 6 is a block diagram illustrating a forensic index apparatus by distributed processing according to another exemplary embodiment of the present invention.

Referring to FIG. 6, the forensic index apparatus using distributed processing according to the exemplary embodiment of the present invention is illustrated. The forensic index apparatus according to the present invention may include a division target data managing unit 100, a division index data generating unit 200, and an index data generating unit 300.

The division target data managing unit 100 divides the data to be indexed according to predetermined division setting for distributed processing to generate the data to be divided. The data to be indexed may be received from a central storage device or an external data storage device. According to the implementation example of the present invention, the number of files of the data to be indexed may be evenly divided into the number of data processing units or divided into data by considering the sizes and the number of the files.

The division index data generating unit 200 includes a plurality of data processing units and the individual data processing units are allocated with the generated data to be divided according to the predetermined division setting, extract the index by filtering the allocated data to be divided, and generate the divided index data including the extracted index.

When the data to be divided are already loaded to the individual data processing units or the data to be indexed, which are divided, are already allocated to the distributive storage unit, a process of loading data to the data processing unit may be controlled to be skipped. That is, the individual data processing units control the data through the distributive storage unit to assure locality.

The division index data generating unit 200 extracts the index by filtering the allocated data to be divided and generates the divided index data including the extracted index. The division index data generating unit 200 may include a distributive storage portion 210, a filtering portion 230, an index extracting portion 250, and a division index data generating portion 270.

The forensic index apparatus may be implemented in such a manner that one virtual distributive storage unit is used as the data storage unit by collecting the distributive storage portions 210. According to the exemplary embodiment of the present invention, the distributed processing framework such as Apache Hadoop may be used and the division target data managing unit and the data processing unit may further include the DFS input/output controlling unit.

The filtering portion 230 which filters the data to be divided, which are allocated to the data processing unit, converts the allocated data to be divided into text data. The allocated data includes various formats of documents such as a general document, a compression file, and an image file and when the allocated data include a forensic image such as DD or Encase, the data is converted and filtered into a plain text without a format by using a filter including a virtual file system (VFS). That is, when information scattered on the image is collected and provided in one file type by configuring a file system table such as an NTFS or FAT, the provided file is converted into the plain text.

Figure 7:
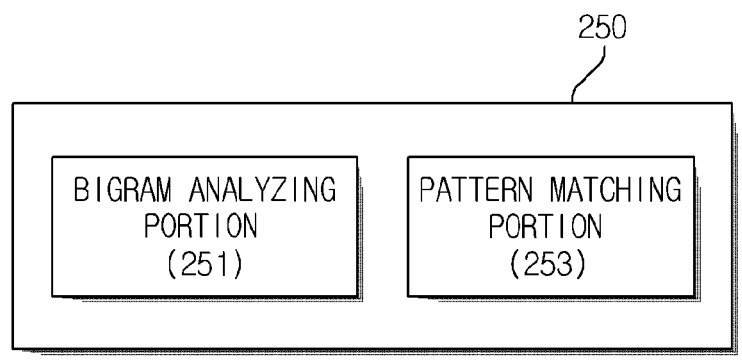
FIG. 7 is a reference diagram illustrating an index extracting unit of the forensic index apparatus by distributed processing according to another exemplary embodiment of the present invention.

Referring to FIG. 7, the index extracting portion 250 will be described. The index extracting portion 250 extracts the index by analyzing the filtered data to be divided. As a method of analyzing data in which the index is extracted, an N-gram method, a morpheme analysis method, a pattern matching method, and the like may be used. According to the exemplary embodiment of the present invention, the index extracting portion 250 may include a bigram analyzing portion 251 and a pattern matching portion 253. By considering a bigram analysis and pattern matching method, the bigram analyzing portion 251 analyzes a text with two syllables with respect to the filtered data and the pattern matching portion 253 extracts the index by judging whether the text is pattern-matched with word data previously set by a user.

The division index data generating portion 270 generates the divided index data by shuffling, sorting, and merging data including information indicating a file which the index is extracted from by matching the data of which the index is extracted with the index extracted by the index extracting portion 250.

The index data generating unit 300 generates the index database by receiving the divided index data from the respective divided index data generating units 200 and merging the received divided index data.

According to the exemplary embodiment of the present invention, the forensic index apparatus may further include a retrieval unit by using the index database by receiving the retrieval word. According to the exemplary embodiment of the present invention, the retrieval word is pre-processed and by retrieving the index database, post-processing may be performed in order to improve accuracy of the retrieval result.

The pre-processing of the retrieval word means removing the stopword which is meaningless as the retrieval word or changing encoding. The post-processing of the retrieval result means, for example, outputting the retrieval result by filtering the digital material retrieved by targeting the bigram index.

Figure 8:
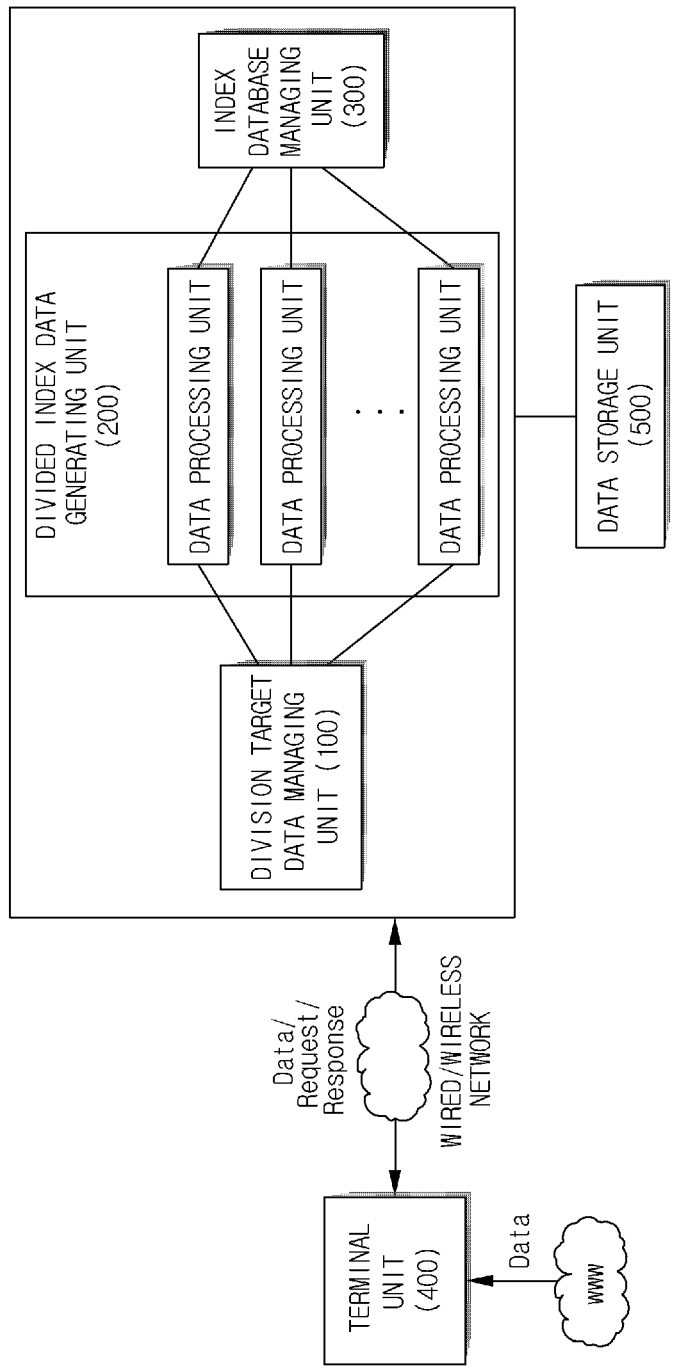
FIG. 8 is a block diagram illustrating a forensic index system by distributed processing according to yet another exemplary embodiment of the present invention.

Referring to FIG. 8, a forensic index system using distributed processing according to an exemplary embodiment of the present invention will be described. The forensic index system according to the exemplary embodiment of the present invention may include a terminal unit 400, a data storage unit 500, and a forensic index apparatus.

The terminal unit 400 may receive inputs such as generation and retrieval of the index from the user or provides an interface for generating and retrieving a forensic index and transfers an inputted command to the forensic index apparatus.

According to the exemplary embodiment of the present invention, the terminal unit may include a virtual file system (VFS) unit for handling a forensic image. When the terminal unit includes the VFS unit, a file system of the forensic image selected by the user is mounted and presented to the user and all files or only a file selected by the user is extracted to be indexed, such that all the files or only the file selected by the user may be stored in the data storage unit. The VFS unit may include a function to extract a deleted file, lost data, and concealed data as well as a normal file.

According to the exemplary embodiment of the present invention, the terminal unit may include a web analysis function to externally control the forensic index apparatus and may include an access control unit that can verify authentication and authority of a target that accesses the forensic index apparatus for such a function.

According to the exemplary embodiment of the present invention, the terminal unit may be provided as a general PC application and a web based or mobile based application type. When the client is operated in a web based or mobile device, complex operations for generating and retrieving the index are performed in the forensic index apparatus and only a result for a request is transferred to the terminal unit, such that the forensic index retrieval may be performed without depending on the performance of the device in which the client is operated.

The data storage unit 500 may store the data to be indexed and include a central storage device. The distributed file system (DFS) may be used to access the distributive storage unit from the data storage unit and the distributive storage unit may be implemented as one virtual distributive storage unit by collecting local storage devices of a physical system performed in the data processing unit.

The forensic index apparatus receives a request for generating and retrieving the index based on a predetermined protocol and may control the data processing unit or control the retrieval unit for generating the index.

A command for generating the index may be processed by using the plurality of data processing units for generating the index and a result thereof may be transmitted to the terminal unit.

In the case of retrieving the index, a retrieval query for the index database stored in the data storage unit is performed and a result of the performed retrieval may be transferred to the terminal unit.

According to the exemplary embodiment of the present invention, the forensic index apparatus may further include a user authenticating unit and when the terminal unit requests a work through a communication unit, an authentication/authorization unit judges whether the corresponding work is performed by an authenticated person and whether data to be accessed is authorized. When the work is not performed by the authenticated user or data which the user does not have an access authority is intended to be accessed, a work request may be denied.

Referring to FIG. 9, as an exemplary embodiment of the present invention, a forensic index method using distributed processing based on a Hadoop framework will be described.

A client that receives an indexing request from the user stores the data to be indexed in the data storage unit. According to the exemplary embodiment of the present invention, as the data storage unit, a high-speed storage device such as a network attached storage (NAS) may be used and a file system such as a network file system (NFS) may be used to access data.

When the forensic index apparatus divides the data stored in the data storage unit and loads the divided data to the data processing units, each data processing unit uploads the allocated data to the distributed file system.

In this case, the number of objects (files and directories) which can be stored in the Hadoop file system is determined by a memory size and since a cost is required to manage each file, it is more advantageous in the management cost to store a file having a large size than a file having a small size.

Therefore, an original file having a small size is configured as one database in order to improve a processing speed and prevent a storage space from being wasted at the time of distributively processing a large quantity of data. The original file is configured by the table, such that a material structure to be stored is simplified and the original file may be easily brought by using a file identifier (FID) as a primary key even at the time of retrieving the file.

The original file table sets the file identifier (FID) as the key and has a content of the file as a storage value. When the data processing unit directly accesses the data storage unit, data loading may be omitted. A file information table in which the FID and an original file path are matched with each other is generated together while the data is stored in the data storage unit. The original file path may be provided instead of the FID at the time of providing the retrieval result to the user by configuring the file information table and the FID is used as the key and the original file path is provided as the value.

A pair of key and value using the FID as the key and the file content as the value is read from the original file table to configure a series of processes of filtering, index word analysis, and shuffling, sorting, and merging of the analyzed index word by using a Hadoop programming model constituted by mapping and reducing.

A result generated through the mapping/reducing process is the pair of key and value using the index word as the key and using a list of identifiers of files including the index word, that is, the FID list as the value. The pair of the key and the value is stored in an index table and in the case of a pattern matching index, the key becomes a regular pattern, and the value becomes a pair constituting the value as information including a frequency per FID and a positional address (a start address and an end address) in a file depending on the frequency.

When the original file is configured by the table, it is possible to solve a lack of storage space which may occur when a file having a smaller size than a basic unit (block, default: 64 MB) processed by Hadoop structure is stored in the HDFS and an increase in cost caused by scheduling, process fork, inter-process communications, and the use of the memory which occur when one mapper process is performed per block storing the small-sized file at the time of performing the mapping/reducing process.

When the user intends to review the file content in the result of retrieving the file, the file content can be immediately found by using the key value in the table, and as a result, it is possible to quickly handle a user's request.

Index technologies performed in an existing single system, a method of improving a retrieval velocity by configuring the index DB in a tree structure to be stored in the file has been used, but in the case of indexing a large quantity of data, as the size of the index DB increases, scalability and reliability need to be ensured.

Therefore, large-scale data need to be stored and managed and in the present invention, the index DB is stored in a NoSql database capable of satisfying the requirement.

The exemplary embodiments of the present invention can be prepared by a computer program. Codes and code segments constituting the computer program can be easily inferred by a computer programmer skilled in the art. The computer program is stored in computer readable information storing media and read and executed by a computer to implement the exemplary embodiments. The information storing media include a magnetic recording medium, an optical recording medium, and a carrier wave medium.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A forensic index method by distributed processing, comprising:
generating data to be divided by dividing data to be indexed according to predetermined division setting for distributed processing;

allocating the generated data to be divided to a plurality of data processing units according to the predetermined division setting, extracting an index by filtering the allocated data to be divided in the plurality of data processing units, and generating divided index data including the extracted index using the plurality of data processing units; and generating an index database by merging the generated divided index data, wherein generating the index database comprises:

when a new index is generated in the index database from the merged generated divided index data, setting an index database identifier as a key in the index database and adding the merged generated divided index data to a list of data corresponding to the key; and when generated index data corresponds to a file being added to an existing index, generating a temporary index data having a temporary index using the generated index data and adding the temporary index to a list of data corresponding to the key of the existing index.

2. The forensic index method of claim 1, wherein in the generating of the data to be divided, the data to be divided is generated by dividing the data to be indexed by a number of files included in the data to be indexed and a number of the data processing units based on the predetermined division setting for distributed processing or the data to be divided is generated according to the number and sizes of the files included in the data to be indexed based on the predetermined division setting.

3. The forensic index method of claim 2, wherein generating of the divided index data includes:

allocating the generated data to be divided to the plurality of data processing units and loading the data to be divided which are allocated to at least one of the plurality of data processing units into a distribution storage unit of the at least one data processing unit;

filtering the loaded data to be divided;

extracting the index with respect to the filtered data to be divided; and generating the divided index data including the extracted index.

4. The forensic index method of claim 3, wherein the filtering of the data to be divided includes:

converting the data to be divided into text data by using a file filter including a virtual file system (VFS); and extracting filtered data from the converted text data.

5. The forensic index method of claim 3, wherein in the extracting of the index, an index target is extracted by dividing the filtered data to be divided into N syllable units and the index is extracted by comparing the extracted index target with a predetermined pattern.

6. The forensic index method of claim 3, wherein the generating of the divided index data includes:

matching data of which the index is extracted with the extracted index; and shuffling, sorting, and merging the matched data, which are generated as the divided index data.

7. The forensic index method of claim 1, further comprising:

performing retrieval by using the index database by receiving a retrieval word from a user.

8. A forensic index apparatus by distributed processing, comprising:

a computer memory;

a division target data managing unit generating data to be divided by dividing data to be indexed according to predetermined division setting for distributed processing;

a divided index data generating unit, including a plurality of data processing units, allocating the generated data to be divided to each of the plurality of data processing units according to the predetermined division setting, extracting an index by filtering the corresponding allocated data in each of the plurality of data processing units using the respective data processing unit, and generating divided index data including the extracted index using the respective data processing unit; and an index database managing unit generating an index database by merging the generated divided index data generated by the plurality of data processing units, wherein generating the index database comprises:

when a new index is generated in the index database from the merged generated divided index data, setting an index database identifier as a key in the index database and adding the merged generated divided index data to a list of data corresponding to the key; and when generated index data corresponds to a file being added to an existing index, generating a temporary index data having a temporary index using generated index data and adding the temporary index to a list of data corresponding to the key of the existing index.

9. The forensic index apparatus of claim 8, wherein the division target data managing unit generates the data to be divided by dividing the data to be indexed by a number of files included in the data to be indexed and a number of the data processing units based on the predetermined division setting for distributed processing or generates the data to be divided according to the number and sizes of the files included in the data to be indexed based on the predetermined division setting.

10. The forensic index apparatus of claim 9, wherein at least one of the plurality of data processing units includes:

a distributive storage portion being allocated with the generated data to be divided according to the predetermined division setting and loading the allocated data to be divided;

a filtering portion filtering the data to be divided, which are loaded to the distributive storage portion;

an index extracting portion extracting the index from the filtered data to be divided; and a divided index data generating portion generating the divided index data including the extracted index.

11. The forensic index apparatus of claim 10, wherein the filtering portion includes:

a text converting portion converting the data to be divided into text data by using a file filter including a virtual file system (VFS); and a filtered data extracting portion extracting filtered data from the converted text data.

12. The forensic index apparatus of claim 10, wherein the index extracting portion includes:

an N-gram analysis portion extracting an index target by dividing the filtered data to be divided into N syllable units; and a pattern comparison portion extracting the index by comparing the extracted index target with a predetermined pattern.

13. The forensic index apparatus of claim 10, wherein the divided index data generating portion includes:

an index matching portion matching data of which the index is extracted with the extracted index, and generates the divided index data by shuffling, sorting, and merging the matched data, which are generated as the divided index data.

14. A forensic index system by distributed processing, comprising:
    a terminal unit providing an input interface to a user;
    a data storage unit storing data to be indexed; and
    a forensic index apparatus dividing the data to be indexed according to predetermined division setting, generating divided index data by using a plurality of data processing units with respect to the divided data to be indexed, and generating an index database by merging the generated divided index data, wherein generating the index database comprises:
    when a new index is generated in the index database from the merged generated divided index data, setting an index database identifier as a key in the index database and adding the merged generated divided index data to a list of data corresponding to the key; and
    when generated index data corresponds to a file being added to an existing index, generating a temporary index data having a temporary index using the generated index data and adding the temporary index to a list of data corresponding to the key of the existing index.

15. The forensic index system of claim 14, wherein the forensic index apparatus includes:
    a division target data managing unit generating data to be divided by dividing data to be indexed by a number of files included in the data to be indexed and a number of the data processing units or generating the data to be divided according to the number and sizes of the files included in the data to be indexed;
    a divided index data generating unit allocating the generated data to be divided to the plurality of data processing units, extracting an index by loading the data to be divided, which are allocated in the plurality of data processing units and filtering the loaded data, and generating the divided index data including the extracted index; and
    an index database managing unit generating the index database by merging the generated divided index data.

* * * * *